United States Patent
Young et al.

(10) Patent No.: US 10,321,313 B2
(45) Date of Patent: Jun. 11, 2019

(54) ENABLING REMOTE ACCESS TO A SERVICE CONTROLLER HAVING A FACTORY-INSTALLED UNIQUE DEFAULT PASSWORD

(71) Applicant: Dell Products L.P., Round Rock, TX (US)

(72) Inventors: Jason Matthew Young, Round Rock, TX (US); Marshal F. Savage, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 233 days.

(21) Appl. No.: 15/261,467

(22) Filed: Sep. 9, 2016

(65) Prior Publication Data

US 2018/0077568 A1    Mar. 15, 2018

(51) Int. Cl.
H04L 29/06    (2006.01)
H04W 12/06    (2009.01)

(52) U.S. Cl.
CPC .......... H04W 12/06 (2013.01); H04L 63/083 (2013.01)

(58) Field of Classification Search
CPC ... H04L 63/0823; H04L 63/083; H04W 12/06
USPC .......................................................... 726/7
See application file for complete search history.

(56) References Cited

U.S. PATENT DOCUMENTS

| 7,971,238 | B2 * | 6/2011 | Pan ........................ G06F 21/34 713/182 |
| 8,136,146 | B2 | 3/2012 | Hahn et al. |
| 8,352,420 | B2 | 1/2013 | Jung et al. |
| 8,725,550 | B2 | 5/2014 | Drittler et al. |
| 9,203,829 | B1 | 12/2015 | Levine et al. |
| 9,348,991 | B2 | 5/2016 | Weeden |
| 2002/0112186 | A1 * | 8/2002 | Ford ..................... H04L 63/101 726/7 |
| 2002/0196944 | A1 * | 12/2002 | Davis ...................... G06F 21/10 380/277 |
| 2005/0015601 | A1 * | 1/2005 | Tabi .................... G06F 21/6227 713/182 |
| 2005/0049886 | A1 | 3/2005 | Grannan et al. |
| 2005/0060581 | A1 * | 3/2005 | Chebolu ............... H04L 63/102 726/4 |
| 2005/0223219 | A1 * | 10/2005 | Gatto ...................... G07F 17/32 713/156 |
| 2006/0022048 | A1 * | 2/2006 | Johnson ............. G06F 17/3087 235/462.1 |

(Continued)

*Primary Examiner* — Syed A Zaidi
(74) *Attorney, Agent, or Firm* — Jackson Walker L.L.P.

(57) ABSTRACT

A service controller of an information handling system provides a login user interface to a remotely located user. The service controller includes a factory-installed random unique password as its default password. If the service controller is in its original state, the service controller may grant access to the remote user based on original access input that differs from the default password. If the service controller verifies the user's access entitlement, remote access may be granted to the remote user and the remote user may modifying the default password. Access may be granted to the remote user based on user input that includes the user's credentials for accessing a database of asset, owner, and entitlement information maintained by the system supplier. Access may also be granted based on original access input including or indicative of the service controller license.

18 Claims, 6 Drawing Sheets

(56) References Cited

U.S. PATENT DOCUMENTS

| | | | |
|---|---|---|---|
| 2006/0101347 A1* | 5/2006 | Runov | G06F 17/30067 |
| | | | 715/764 |
| 2006/0160626 A1* | 7/2006 | Gatto | A63F 13/12 |
| | | | 463/43 |
| 2007/0016827 A1* | 1/2007 | Lopez, Jr. | G06F 11/2294 |
| | | | 714/31 |
| 2008/0046989 A1* | 2/2008 | Wahl | G06F 21/55 |
| | | | 726/7 |
| 2008/0114980 A1 | 5/2008 | Sridhar | |
| 2009/0320114 A1 | 12/2009 | Guo et al. | |
| 2009/0320116 A1 | 12/2009 | Guo et al. | |
| 2010/0146608 A1 | 6/2010 | Batie et al. | |
| 2012/0008786 A1 | 1/2012 | Cronk et al. | |
| 2012/0011567 A1 | 1/2012 | Cronk et al. | |
| 2014/0020077 A1 | 1/2014 | Court et al. | |
| 2014/0026205 A1 | 1/2014 | Guo et al. | |
| 2014/0259130 A1* | 9/2014 | Li | G06F 21/31 |
| | | | 726/6 |
| 2014/0298418 A9 | 10/2014 | Cronk et al. | |
| 2014/0337053 A1 | 11/2014 | Smith | |
| 2015/0256337 A1 | 10/2015 | Nguyen et al. | |
| 2016/0044124 A1 | 2/2016 | Sarukkai et al. | |
| 2016/0088327 A1 | 3/2016 | Cronk et al. | |
| 2016/0094543 A1 | 3/2016 | Innes et al. | |

* cited by examiner

US 10,321,313 B2

ENABLING REMOTE ACCESS TO A SERVICE CONTROLLER HAVING A FACTORY-INSTALLED UNIQUE DEFAULT PASSWORD

TECHNICAL FIELD

Disclosed subject matter pertains to managing information handling systems and, more specifically, remotely accessing a management controller for an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information.

Because information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. Information handling systems may also include a variety of hardware and software components that may be configured to process, store, and communicate information and may include one or more computer systems, data storage systems, and networking systems.

Servers and other types of information handling systems may include a dedicated resource that supports and facilitates distributed management tasks. Such a resource may be referred as a service controller, baseboard management controller (BMC), or management controller. A service controller may execute a user interface that enables a user to access the service controller for performing various tasks. Management controller interfaces are typically provisioned with an interface that prompts for and requires login credentials before granting access to the user.

The manufacturer, seller, distributor, provider, or other type of supplier of an information handling system that includes a service controller may configure the service controller with a factory-installed or default password that a must be entered the first time the service controller is accessed by a user. While the information handling system supplier may program or otherwise install the same default password on all systems for the sake of simplicity, such a practice is generally considered undesirable from a security perspective. In contrast, the information handling system supplier may assign a randomly generated password to each new system. This practice, however, may prove difficult to administer due to the potentially large number of default passwords that must be maintained.

SUMMARY

Some combination of the simplicity associated with a single default password and the comparative security of randomly assigned default passwords may be achieved by employing randomly generated passwords, subsequently referred to herein as unique random passwords, while also making the default password readily detectable to an administrator or other user of the system. In at least one implementation, a randomly generated, factory-installed default password is printed or otherwise "published" on an exterior surface of the information handling system chassis. In such embodiments, an administrator or other user who is "local" to the information handling system, i.e., within visible proximity of the information handling system, can perform the first login to the service controller based on visual inspection of the information handling system.

Publishing the random unique password, whether on the information handling system chassis or elsewhere on or near the information handling does not, however, enable a remote administrator or other user, who cannot see the information handling system, to access the service controller without prior knowledge of the random unique password.

In accordance with disclosed subject matter, disadvantages and problems associated with performing an initial access of a remotely located service controller configured with a unique random password are addressed.

In accordance with a disclosed remote access method, a service controller of an information handling system detects a remote user attempting to access the service controller, e.g., web browsing to a uniform resource identifier assigned to the service controller. The service controller responds by returning a web page that includes a login user interface to the remote user.

The login user interface returned to the remote user may depend, at least in part, on the state of the service controller. In at least one embodiment, the service controller distinguishes between initial access login attempts and other login attempts. Initial access login attempts include access attempts that occur while the service controller is in its factory-configured state, sometimes referred to herein as its original state. In this context, references to an original state of the service controller may refer to the state of the service controller as shipped from the supplier, as delivered to the customer, as placed into service on behalf of the customer, or following a system restore procedure. A service controller may include a flag or register that indicates whether the service controller is in an original state.

Disclosed service controllers may include a factory-installed unique random password that serves as the service controller's original or default password. Initial access attempts may be granted subject to a match between the original password and a password provided by the user via the login screen. The original password may be printed, stamped, or otherwise displayed on a visible surface of the information handling system chassis, in which case the service controller password can be readily obtained by a user who is within visual range of the information handling system.

A user attempting an initial access of the service controller from a remote system, i.e., a remote user, generally cannot see the original password displayed on a side of the system. Unless the remote user has prior knowledge of the original password, the remote user may be unable to access the service controller absent one or more alternative authentication features that permit the remote user to access an original state service processor, i.e., a service processor that is in its original state, without providing the original password.

Such alternative authentication features may attempt to verify the remote user's entitlement to access the service controller based on user input other than the original password. If the service controller successfully verifies the remote user's access entitlement, the service controller grants the remote user remote access to the service controller, at which time the remote user may perform any of various remote management tasks including modifying the service controller password. After the service controller password is modified and the service controller is no longer in its original state, the service controller may disable any or all alternative authentication features. In at least one embodiment of the service controller that includes a federated login feature as one of its alternative authentication features, federated login may remain as an option for logging into the service controller.

Embodiments of the service controller may be configured to support more than one alternative authentication method. In such embodiments, the service controller may prompt for or otherwise accept user input selecting one of the supported authentication methods before generating the login user interface provided to the user.

In at least one embodiment, the service controller supports a first authentication method, referred to herein as asset ownership & entitlement (AO&E) authentication, a second authentication method, referred to herein as a service controller signature method, and a third authentication method referred to herein as a federated login method.

The AO&E authentication method may verify the user's service controller access entitlement by accessing a service or interface to a database, referred to herein as the AO&E database, of information pertaining to information handling systems manufactured, sold, distributed, or otherwise provided by the information handling system supplier. The My Account™ service of Dell, Inc. exemplifies a service for accessing a database that includes at least some of the AO&E information referred to herein.

The AO&E database may encompass information maintained in two or more distinct databases of a particular information handling system supplier. As an example, an information handling system supplier may employ a sales based database to capture initial data for users and user accounts, a manufacturing database for capturing system unique information, and a third database for capturing information about software and software licenses, including entitlement information identifying individual users licensed to access applicable software. In this example, each of the databases, although distinct, may be linked via one or more attributes shared in common between the two databases.

While the AO&E database may focus on information handling systems of a particular supplier, the creation and/or management of the AO&E database may be delegated to an external party. Moreover, AO&E databases may encompass the information handling systems of two or more suppliers.

The AO&E database may be implemented as a relational database, structured and/or formatted in accordance with an AO&E schema and configured to represent associations among two or more attributes supported by the AO&E schema, including any one or more of the following AO&E attributes: system identifier, system owner, service tag, service controller identifier, service controller license, service controller license key, service controller unique random password, service controller entitlement identifier, federated access enabled, federated access user; AO&E user account, including an AO&E userID attribute and an AO&E password attribute.

In at least one embodiment of AO&E authentication, the original access input provided to the service controller's login user interface includes the remote user's credentials for accessing the asset ownership and entitlement (AO&E) database. As a non-limiting example, the remote user may access the AO&E database by way of a user account personal to the remote user, in which case the remoter user's credentials for accessing the AO&E database might include a user account identifier (userID) and a user account password. In this example, the remote user's original access input to the service controller's login user interface may include the UserID and password for the remote user's AO&E account.

The service controller may include a web interface that forwards or otherwise presents the remote user's original access input, i.e., the remote user's AO&E credentials, to an application program interface of the AO&E database. The original access input may be digitally signed, in which case the application programming interface may validate a digital signature included with the original access input. Subject to such validation, the application programming interface may then establish a connection between the service controller and the AO&E database and thereby provide the remote user's AO&E credentials to the AO&E database to establish a trusted basis for recognizing the remote user's entitlement to access the service controller and for subsequently granting that access to the remote user.

For example, upon validating the service controller as the trusted source of the original access input, the AO&E database may return to the service controller an AO&E response referred to herein as remote access information. AO&E authentication may support an embodiment in which the remote access information includes or indicates the unique random password that was factory-installed in the service controller. AO&E authentication may also support an embodiment in which the remote access information is a proxy password, i.e., a substitute for the unique random password. The proxy password may be associated with or indicative of a resource bound to the information handling system.

In at least one embodiment, the proxy password includes a license key comprising a digital signature of the service controller license bound to the information handling system's service tag. The encryption key used to sign a license key may be rooted in a secured trusted certificate chain of the information handling system supplier. The service controller may then validate the license key and match an entitlement identifier included in or otherwise associated with the license key with an entitlement identifier included in the service controller license installed on the service controller.

Embodiments that support federated authentication may perform at least some of the operations performed using AO&E authentication. However, before the remote user initiates remote access to the service controller, a privileged user may have already indicated, via the AO&E database, service controller entitlement information associating users who have federated access privileges with the applicable license key. The remote user may then elect federated login and provide the remote user's AO&E credentials as the original access input. Once the remote user's AO&E credentials are validated, the AO&E database may be queried to confirm that the remote user has federated access entitlement, after which the service controller may grant the remote user access.

Embodiments that support service controller signature authentication may verify the access entitlement of a remote user based on an original access input that includes or indicates a feature, characteristic, or information unique to the service controller. In at least some of these embodiments, the remote user may first login to the AO&E database and download the license key associated with the applicable service tag to the remote user's system before providing the first input to the service controller by uploading the license key to the service controller.

Like the proxy password employed in the applicable AO&E authentication embodiment, the original access input used for service controller signature authentication may include or indicate the key signature of the service controller license that is bound to the applicable service tag.

To support the various AO&E authentication embodiments referenced above, the AO&E database may include, indicate, or support an association between the information handling system service tag and the unique random password as well as an association between the service tag and the service controller license key or any other suitable form of the proxy password.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and unless indicated otherwise, all drawings are in accordance with the present invention wherein.

DETAILED DESCRIPTION

Preferred embodiments and their advantages are best understood by reference to FIGS. 1-7, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
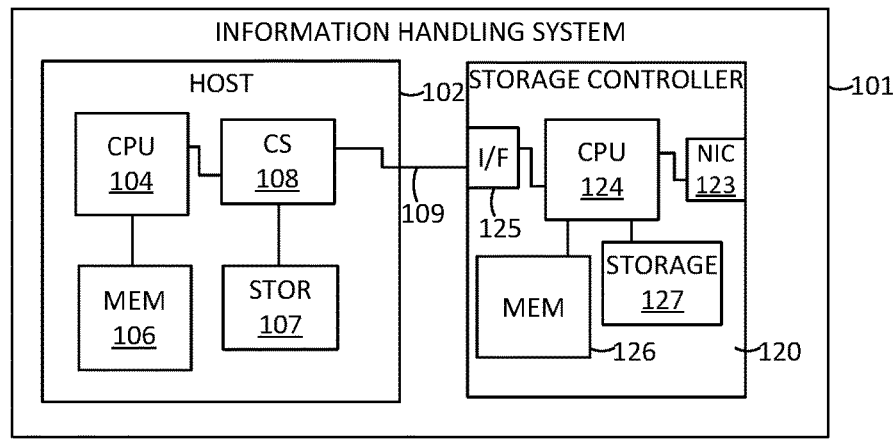
FIG. 1 illustrates a block diagram of an information handling system including a service controller.

FIG. 1 illustrates selected elements of an information handling system 101. The information handling system 101 illustrated in FIG. 1 includes a host 102 and a service controller 120 coupled to host 102. The host 102 includes a central processing unit (CPU) 104 coupled to a host memory 106 via a memory controller (not depicted) and a chip set (CS) 108 that provides various communication interfaces (not depicted explicitly) for coupling CPU 104 to one or more input/output (I/O) devices, including storage 107.

The service controller 120 illustrated in FIG. 1 includes a service controller processor 124 coupled to a service controller memory 126, service controller storage 127, a serial communication interface 125, and a network interface 123. Service controller storage 127, which may include various data structures and executable programs used by service controller 120, may comprise one or more flash memory devices or one or more other types of non-volatile storage.

The descriptions of one or more of the following figures may refer to local access and remote access. For purposes of describing the illustrated figures, local access to service controller 120 refers to access via the communication link 109 coupling host 102 with service controller 120 via communication interface 125. Conversely, remote access to service controller 120 refers to access via wireless or wireline connection (not depicted) between a network interface (NIC) 123 of service controller 120 and an external system or device (not depicted).

As suggested previously, service controller 120 may be delivered to a customer or placed into service on behalf of a customer in a factory-configured or original state, referred to herein as an original state. Service controller 120 may also include a default password that is stored in or otherwise associated with service controller 120 before service controller 120 is delivered. When service controller 120 is in an original state, a user may gain access to service controller 120 by providing the default password. If the user has no prior knowledge of the default password and the default password is not presented to or otherwise available to the user, the user may be unable to access service controller 120.

Knowledge of the default password may be provided to the user by using a standard default password that is common to each of two or more service controllers 120 and, in at least some cases, common to every like-type service controller 120 from the information handling system supplier. The security implications of a standard default password may motivate an information handling system supplier to use non-standard default passwords including, in at least some cases, randomly generated default passwords that are unique to each service controller 120.

Unique default passwords may be made known to a customer's users by providing a visibly detectable alphanumeric text string corresponding to the unique default password with the system, e.g., on or affixed to the system chassis, but the user must me located within eyesight of the system to make use of the text string.

In at least one embodiment, the service controller 120 illustrated in FIG. 1 addresses the challenge of configuring information handling system in an original state that is remotely accessible to the customer's users without using a default password that is known or easily learned by others.

Figure 2:
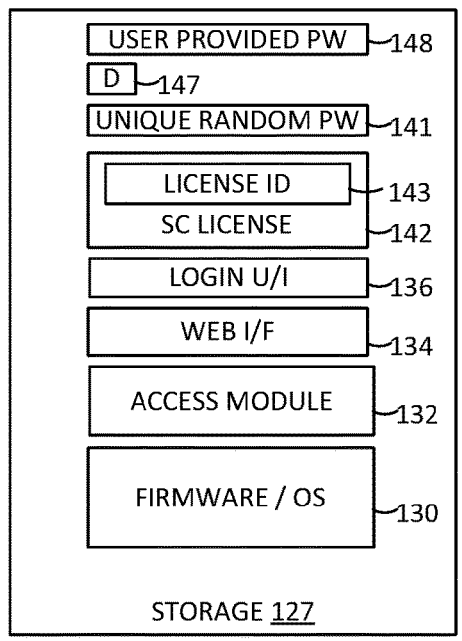
FIG. 2 illustrates a block diagram of storage included in a service controller of the information handling system of FIG. 1.

FIG. 2 illustrates service controller storage 127 including firmware and/or service controller operating system (OS) 130 and an access module 132 that supports local and remote user access. Access module 132 may include or employ a web interface 134 and a login user interface 136.

The service controller storage 127 illustrated in FIG. 2 further includes a unique random password 141 and a service controller license 142, both of which may have burned into or otherwise stored in service controller storage 127 by the information handling system supplier before information handling system 101 is put into service. information handling system 101 may include a visibly detectable alphanumeric representation of unique random password 141, whether printed on a visible surface of a chassis of information handling system 101, printed on a "luggage tag" or a similar article affixed to information handling system 100, or made visibly detectable in another manner.

The service controller license 142 illustrated in FIG. 2 includes a license identifier 143 that distinguishes service controller license 142 from other service controller licenses (not depicted) that may be installed in the service controllers of other information handling systems.

Service controller 120 may include various configuration settings and/or status flags, some or all of which may be implemented in service controller storage 127, service controller memory 126, or one or more dedicated configuration registers (not depicted). An example of such a status flag is the Default (D) status flag 147 of FIG. 2, which although depicted within storage 127, may be implemented in as a configuration register or in service controller memory 126 in other embodiments.

Default status flag 147 may be pre-set at the factory to indicate that service controller 120 is in an original state or factory-configured state. When default status flag 147 is set, access module 132 may use the unique random password 141 for determining user access. In addition, however, when default status flag 147 is set, access module 132 may support or recognize alternative methods for granting access to service controller 120. These alternative methods may include any of the methods described below with respect to FIG. 3 through FIG. 6.

When service controller 120 is successfully accessed for the first time after being sold, shipped, delivered, installed or otherwise placed into service, access module 132 may prompt and/or require the user to select a user provided password, store any password subsequently provided by the user as user provided password 148, and clear the default status flag 147.

In some embodiments, when default status flag 147 is cleared, access module 132 does not support the alternative access methods described below. In other embodiments, clearing the defaults status flag 147 does not alter the access options that access module 132 supports. In still other embodiments, access module 132 may continue to support one or more of the alternative access methods after status flag 147 is cleared, but only for selected users, such as administrators, privileged users, and so forth.

Access module 132 supports functionality enabling a remotely-located user, who may lack prior knowledge of unique random password 141 and who cannot see the visibly detectable representation of unique random password 141, to access an original state service controller 120 with a conventional web browser executing on a remote system. In lieu of requiring user input indicative of the unique random password, access module 132 is configured to grant service controller access to the remote user based on user input that enables the access module to verify the remote user's identity and the remote user's access entitlement. Service controller 120 may support more than one method for granting remote access to an original state service controller.

In one such method, the user input provided to the service controller's access module may include the user's login credentials for accessing an AO&E database (see FIG. 7) that includes data encompassing users, systems, software licenses, and software license entitlements. In another method, the user input provided to the service controller access module may include the service controller license or information derived from the service controller license.

Figure 5:
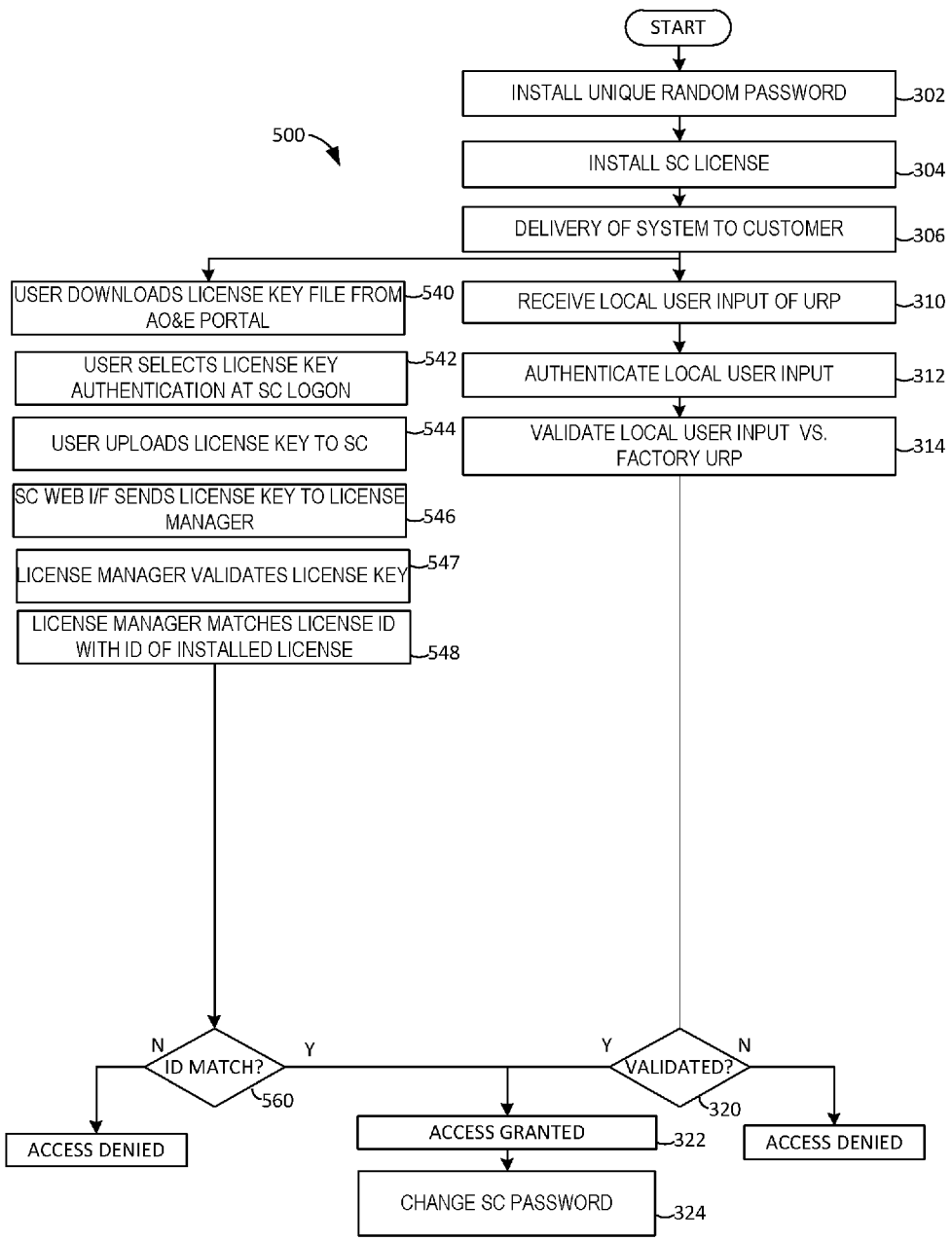
FIG. 5 illustrates a flow diagram of a third method for remotely accessing a service controller.
Figure 6:
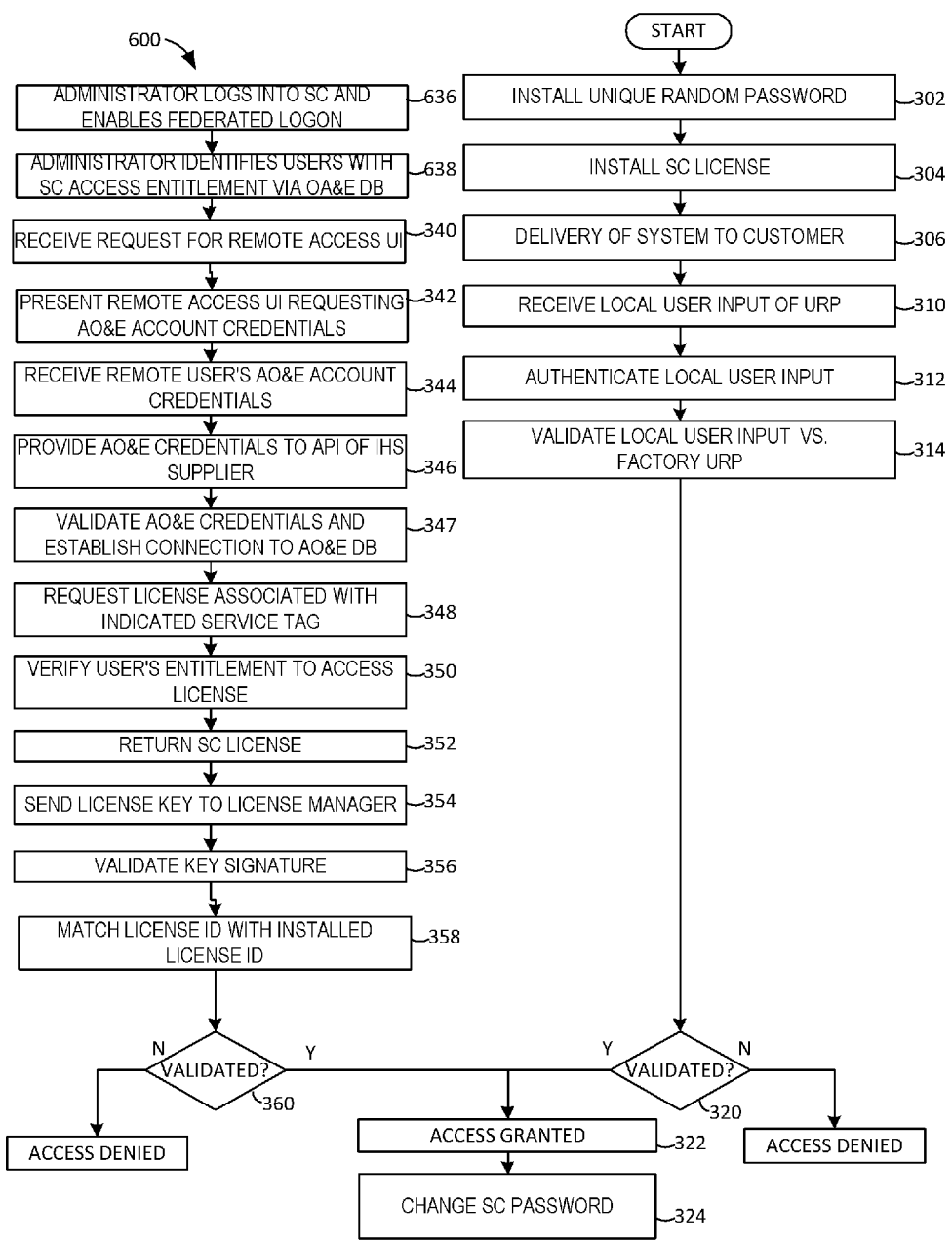
FIG. 6 illustrates a flow diagram of a fourth method for remotely accessing a service controller.
Figure 7:
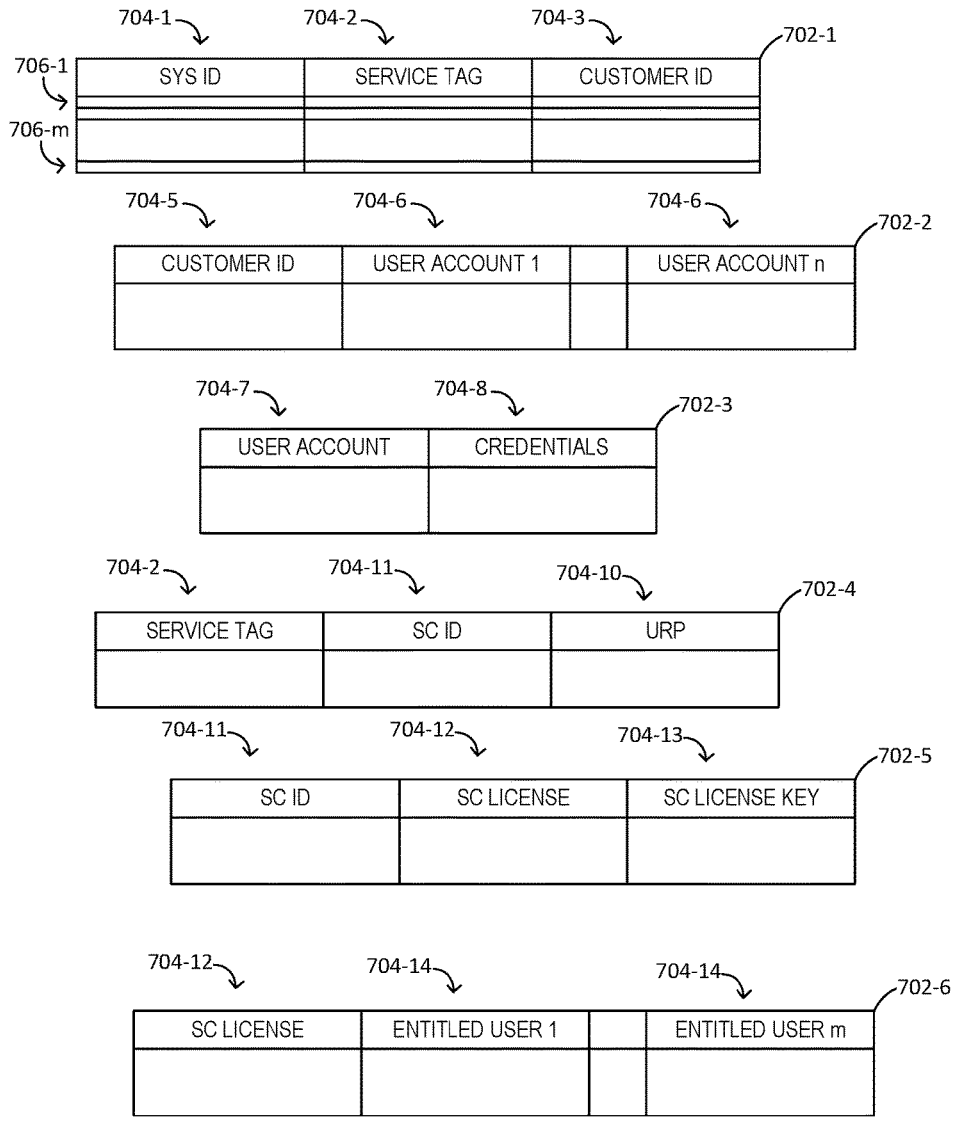
FIG. 7 illustrates features of a database suitable for use in the methods of FIG. 3 through FIG. 6.

Before describing flow diagrams of FIG. 3 through FIG. 6 illustrating selected implementations of methods for remotely accessing an original state service controller, an example AO&E database 700 is illustrated in FIG. 7. The AO&E database 700 illustrated in FIG. 7 is a relational database that includes a plurality of associations or tables 702, each of which includes two or more attributes or fields 704, and zero or more records 706. The tables 702 illustrated in FIG. 7 are example tables and AO&E database 700 may be associated with a database management system (not depicted) that supports queries and other actions to generate more, fewer, and different tables 702, each of which may have more, fewer, and different attributes 704.

Although FIG. 7 represents AO&E database 700 as a single database structure, AO&E database 700 may encompass two more databases maintained by an information handling system supplier. For example, the AO&E database 700 illustrated in FIG. 7 includes tables 702 that may be created, maintained, and/or accessed primarily by users in a sales group whereas other tables 702 may include tables of a manufacturing group, while still other tables may be associated with special purposed or dedicated groups.

The AO&E database 700 illustrated in FIG. 7 includes a first table 702-1 that includes a system identifier attribute 704-1, a service tag attribute 704-2, and a customer identifier attribute 704-3; a second table 702-2 that includes a customer identifier attribute 704-5 and n user account attributes, each of which may include a user associated with the customer indicated by the customer identifier attribute 704-5. A table 702-3 illustrated in FIG. 7 includes a user account attribute 704-7 and corresponding credentials 704-9, which may include two or more credential elements (not shown) such as a UserID attribute and a Password attribute. Tables 702-1 through 702-3 may be associated with a sales group and the user accounts 704-7 of table 702-3 may enable users to access the AO&E database to review information pertaining to historical as well as current and proposed purchases of information handling systems. Tables 702-4 and 702-5 may be part of a manufacturing database that, among other functions, maintains a record of the unique random passwords and software licenses identifiers associated with each system, while table 702-6 may represent a further distinct database for maintaining licensing information and, more specifically in the cases of table 702-6, software controller licensing information.

The table 702-4 illustrated in FIG. 7 includes attributes for the service tag 704-2, a service controller identifier 704-11, and the unique random password, 704-10 while table 702-5 includes attributes for the service controller identifier 704-11, the service controller license 704-12, and the service controller license key 704-13, while a sixth table 702-6 includes attributes for the service controller license 704-12, and a set of m entitled users 704-14.

The methods illustrated in FIG. 3 through FIG. 6 may be performed entirely or primarily by service controller 120 and the operational blocks of FIG. 3 through FIG. 6 represent operations that are or may be performed by service controller 120 absent an express indication to the contrary.

Figure 3:
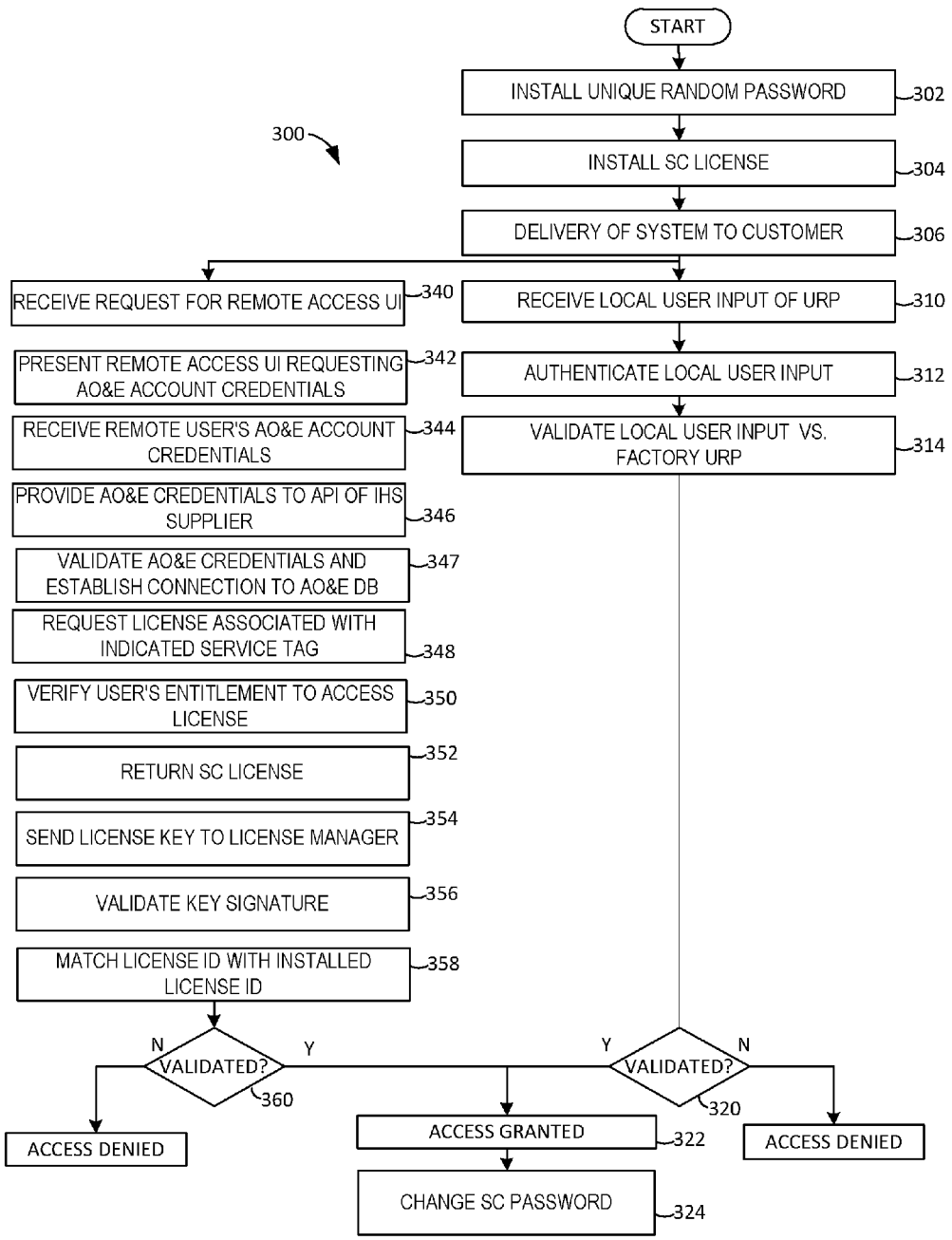
FIG. 3 illustrates a flow diagram of a method for remotely accessing a service controller.

FIG. 3 illustrates a flow diagram of a service controller access method 300 suitable for use in conjunction with a service controller that is pre-configured with a unique random password. The method 300 illustrated in FIG. 3 includes installing (operation 302) a unique random password, such as the unique random password 141 of FIG. 2, and installing (operation 304) a service controller license, such as the service controller license 142 (FIG. 2) in service controller 120. The installed service controller license may include a license identifier, such as the license identifier 143 (FIG. 2).

Installation operations 302 and 304 may include "burning" or otherwise storing the unique random password and the service controller license into service controller storage 127. Installation operation 302 may include or be accompanied by an operation to set default status flag 147 to indicate that service controller 120 is in its original state. The unique random password and the service controller license may be encrypted and/or stored in secure storage locations to reduce unauthorized access or use of the applicable information.

The installation operations 302 and 304 may include or be accompanied by operations (not depicted) for updating the AO&E database to reflect the newly installed unique random password and service controller license.

Installation operations 302 and 304 may represent operations performed by the information handling system supplier before the information handling system is sold, distributed, delivered, and placed into service. Accordingly, the embodiment of method 300 illustrated in FIG. 3 includes a block 306 corresponding to the delivery of the information handling system to the applicable customer. The delivery operation 306 need not necessarily include a physical delivery of an information handling system to the customer's physical location and may, in some cases, simply represent a transfer of title or ownership from the information handling system supplier to the customer.

Attempts to gain access to service controller 120 following the delivery of the information handling system in operation 306 may be referred to herein as original access attempts, first access attempts, or another suitable term to convey that service controller 120 is in an original state when such attempts occur. Similarly, the first access attempt that is successful may be referred to as the first access, original access, or initial access.

Following the delivery of the information handling system in operation 306, the illustrated method 300 may branch to a local access sequence (operations 310-314) or to a remote access sequence (operations 340-358).

The local access sequence 310 begins when an administrator or other user, physically located at or near the information handling system, invokes the service controller access module to display the login user interface. The access module may execute automatically in response to a power transition, a system reset, or keyboard or mouse activity detected by the information handling system.

After observing an alphanumeric representation of the unique random password located on, near, or attached to the information handling system chassis, the local user inputs the unique random password and service controller 120 receives (operation 310) the local user input of the unique random password. The local portion of the method 300 illustrated in FIG. 3 further includes authenticating (operation 312) the local user input by, for example, generating a digital signature of the local user input, delivering the digital signature with the local user input, and authenticating the digital signature by the service controller.

Following successful authentication of the local user input, method 300 includes validating (operation 314) the local user input against the factory installed unique random password residing in service controller storage. If (operation 320) the validation of local user input is successful, local user access to service controller 120 is granted (operation 322), enabling the local user to perform management task including, as one example, changing the service controller password (operation 324), which may clear a default status flag.

In some embodiments, the remote access sequence starting at operation 340 represents an alternative access sequence that may be available only when service controller 120 is in the original state. In these embodiments, once service controller 120 transitions from the original state, alternative access sequences including the sequence from operation 340, may be unavailable. In other embodiments, the remote access sequence may be available to some or all users even after service controller 120 transitions from the original state.

The remote access sequence illustrated in FIG. 3 begins when a web interface of the service controller receives (operation 340) a request for the remote access user interface from the remote user. The request from the remote user may be generated when a conventional web browser executing on the remote user's information handling system is "pointed to" a uniform resource identifier (URI) corresponding to the remote access UI.

The service controller may support multiple types of remote access under appropriate circumstances and, accordingly, the access module may prompt (not depicted) the remote user to select among supported remote access methods. The remote access sequence beginning at operation 340 illustrated in FIG. 3, represents a type of remote access referred to herein as AO&E authentication.

The method 300 illustrated in FIG. 3 presents (operation 342) a remote access user interface prompting the remote user to provide the remote user's credentials for accessing the AO&E database. The remote user may have an established user account enabling the remote user to access the AO&E database and, in these cases, the remote user may provide the remote user's AO&E account credentials, e.g., User ID and Password to the remote access UI.

The remote access UI may then receive (operation 344) remote user input indicating the remote user's AO&E account credentials. The storage controller's web interface may then provide (operation 346) the remote user's AO&E credentials to an API of the information handling system supplier. The API may then validate (operation 347) the remote user's credentials and connect to the AO&E database. The web interface may then request (operation 348) the service controller license that is bound to the information handling system associated with service tag.

Upon verifying (operation 350) the user's entitlement access via the AO&E database, the service controller license is returned (operation 352). The service controller web interface may then send (operation 354) the license key to service controller to a License Manager, which validates (operation 356) the key signature and matches (operation 358) the license identifier against the license identifier retrieved from the installed license. If (operation 360) the license identifier matches, service controller 120 grants (operations 322) the remote user access, enabling the remote user to change (operation 324) the default password and perform other management tasks.

Figure 4:
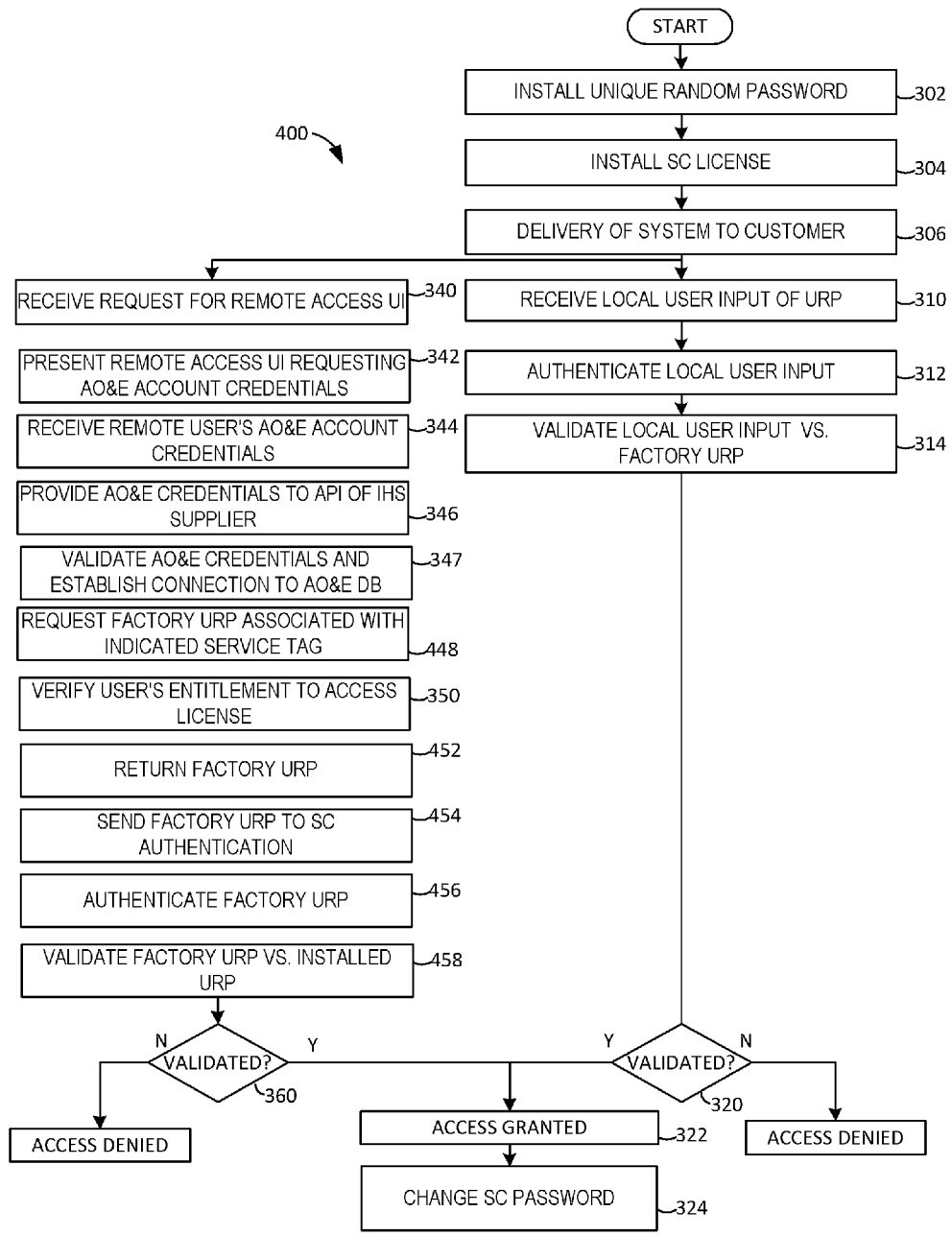
FIG. 4 illustrates a flow diagram of a second method for remotely accessing a service controller.

FIG. 4 illustrates a flow diagram of another service controller access method 400, which, like the method 300 of FIG. 3 is suitable for use in conjunction with a service controller pre-configured with a unique random password Method 400 includes numerous operations that are substantially equivalent to analogous operations of method 300 and these operations are identified with a 3XX reference numeral. Operations of method 400 that differ in substance from the operations of method 300 are indicated with a 4XX reference numeral and the following descriptions is concentrated on these operations.

Method 400, like method 300, leverages the remote user's previously established relationship with the information handling system supplier and, more specifically, the remote user's AO&E login credentials, to establish the user's identity and access entitlement. Rather than retrieving a license key from the AO&E database, however, method 400, requests (operation 448) the factory installed unique random password. The unique random password returned (operation 452) from the AO&E database is then forwarded (operation 454) to a service controller authentication module that performs operations analogous to the operations 312 and 314 performed for local access. Specifically, the unique random password returned by the AO&E database is authenticated (operation 456), analogous to the authentication of the user input in operation 312, and validated (operation 458) analogous to the validation of the local user input in operation 314.

FIG. 5 illustrates a flow diagram of another service controller access method 500, that differs from methods 300 and 400 in the user input upon which service controller 120 may grant remote access. Particularly, instead of providing login credentials for the user's AO&E account, method 500 uploads the service controller license 142 (FIG. 2), which the remote user has previously downloaded to a remote user system from an AO&E portal, to service controller 120. Specifically, the method 500 illustrated in FIG. 5 includes the user downloading (operation 540) the applicable license key, from an AO&E portal, to a remote user's system, e.g., the user's laptop or desktop information handling system. The user then browses to the service controller to obtain the service controller login screen and the remote user selects (operations 542) a license key authentication option from the login screen. The user then uploads (operation 544) the license key obtained from the AO&E database to service controller. The service controller's web interface then sends (operation 546) the license key to a license manager, which may be networked or distributed service provided by the information handling system supplier. The license manager may then validate (operation 547) the license key before matching (operation 548) the license identifier (FIG. 1) with the license identifier found in the installed license. If the license identifiers match (operation 560) remote access is granted (operation 322) and the user may change (operation 324) the service controller password.

FIG. 6 illustrates a method 600 associated with federated login capability in which a privileged user employs the AO&E database to enable federated login functionality and to define service controller access rights of one or more other users. Each of the designated users may then access the service controller in a manner substantially equivalent to the method 300 illustrated in FIG. 3.

Referring to FIG. 6, the method 600 includes an administrator or other privileged user logging in to the service controller, using any of the methods 300, 400, or 500, previously described, and enabling (operation 636) federated login capability. The administrator may then identify (operation 638) via the AO&E database, users with service controller access entitlements. The designated users may then remotely access the service controller, via operations 340 to 360 in a manner substantially similar to the like-numbered operations of FIG. 3.

In the operation 350 of FIG. 6, however, the verification of the user's entitlement to access the license may be determined based upon the entitlement indication, or lack thereof, provided by the administrator in operation 638. If the administrator subsequently modifies the entitlement information to remove a previously-authorized user, any subsequent federated login attempt by the user will fail.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A remote access method, comprising:
providing, by a service controller of an information handling system, a login user interface wherein the service controller includes a unique random password as a default password;
receiving an original access input from a remote user, wherein the original access input is not indicative of the unique random password; and
responsive to verifying, based on the original access input, access entitlement of the remote user, granting the remote user remote access to the service controller;
wherein the original access input comprises login credentials corresponding to a user account for accessing an asset owner and entitlement (AO&E) database of a supplier of the information handling system and wherein verifying access entitlement includes:
 presenting, for validation, the login credentials to an application programming interface to the AO&E database; and
 subject to validation of the login credentials, receiving, from the application programming interface, an AO&E response including a remote access information selected from:
  the unique random password; and
  a proxy password indicative of a service controller resource bound to the information handling system.

2. The method of claim 1, wherein, the remote access information comprises a digitally signed password and wherein the method includes validating a digital signature associated with the remote access information.

3. The method of claim 1, wherein:
the remote access information comprises the proxy password;
the AO&E database includes attributes including unique service tags for each information handling system; and
verifying access entitlement includes providing the service tag to the application programming interface.

4. The method of claim 3, wherein the proxy password is determined in accordance with a service controller license installed on the service controller.

5. The method of claim 4, wherein the proxy password includes a license key comprising a digital signature of the service controller license.

6. The method of claim 5, further comprising validating the license key and matching a service controller license identifier bound to the service tag with a license identifier included in the services controller license installed on the service controller.

7. The method of claim 1, wherein:
the remote access information provided in the AO&E response comprises the unique random password;
the AO&E database includes attributes for a service tag unique to the information handling system and for the unique random password; and verifying access entitlement includes providing the service tag to the application programming interface.

8. The method of claim 7, further comprising:
verifying the unique random password included in the AO&E response against the unique random password installed in the service controller.

9. The method of claim 1, further comprising:
enabling, by a privileged user, a federated logon options of the service controller, wherein the AO&E database reflects service controller entitlement input, from the privileged user, associating a service controller license key with one or more AO&E user accounts;
providing a federated logon option as an initial access option to the remote user; and
responsive to detecting remote user selection of the federated logon option, providing the remote user with a login user interface for the AO&E database;
responsive to receiving and authenticating AO&E database credentials from the remote user, determining access to the storage controller based upon the one or more AO&E user accounts.

10. The method of claim 1, wherein the service controller includes a service controller license and wherein the original access input comprises license information indicative of the service controller license.

11. The method of claim 10, wherein the license information includes a license key comprising a digital signature of the service controller license.

12. The method of claim 11, further comprising:
validating the license key; and
matching an entitlement identifier associated with the license key with an entitlement identifier of the services controller license installed on the service controller.

13. The method of claim 10, wherein receiving the original access input comprises uploading the license key from a remote user system to the service controller.

14. An information handling system, comprising:
a host comprising a host processor and host memory; and
a service controller, coupled to the host, the service controller including:
 a service controller processor;
 a service controller memory including instructions, executable by the service controller processor, that, when executed, cause the system to perform operations comprising:
  providing a login user interface wherein the service controller includes a unique random password as a default password and;
  receiving an original access input from a remote user, wherein the original access input is not indicative of the unique random password; and
responsive to verifying, based on the original access input, access entitlement of the remote user, granting the remote user remote access to the service controller, wherein:
the original access input comprises login credentials corresponding to a user account for accessing an asset owner and entitlement (AO&E) database of a supplier of the information handling system and wherein verifying access entitlement includes:
 presenting, for validation, the login credentials to an application programming interface to the AO&E database; and
 subject to validation of the login credentials, receiving, from the application programming interface, an AO&E response including a remote access information selected from:

the unique random password; and
a proxy password indicative of a service controller resource bound to the information handling system.

15. The information handling system of claim 14, wherein:
the remote access information comprises the proxy password;
the AO&E database includes attributes including unique service tags for each information handling system; and
verifying access entitlement includes providing the service tag to the application programming interface.

16. The information handling system of claim 15, wherein the proxy password includes a license key comprising a digital signature of a service controller license installed on the service controller.

17. The information handling system of claim 14, wherein:
the remote access information provided in the AO&E response comprises the unique random password;
the AO&E database includes attributes for a service tag unique to the information handling system and for the unique random password;
verifying access entitlement includes providing the service tag to the application programming interface; and
verifying the unique random password included in the AO&E response against the unique random password installed in the service controller.

18. The information handling system of claim 17, wherein the operations include:
enabling, by a privileged user, a federated logon option of the service controller, wherein the AO&E database reflects service controller entitlement input, from the privileged user, associating a service controller license key with one or more AO&E user accounts;
providing a federated logon option as an initial access option to the remote user; and
responsive to detecting remote user selection of the federated logon option, providing the remote user with a login user interface for the AO&E database;
responsive to receiving and authenticating AO&E database credentials from the remote user, determining access to the storage controller based upon the one or more AO&E user accounts.

* * * * *